United States Patent Office 2,708,202
Patented May 10, 1955

2,708,202

PREGNENE-21-ALDEHYDES, THEIR DERIVATIVES AND PROCESS THEREOF

Karl Pfister III, Westfield, N. J., and William J. Leanza, Staten Island, N. Y., assignors to Merck & Co., Inc., Rahway, N. J., a corporation of New Jersey No Drawing. Application April 30, 1952,
Serial No. 285,318

19 Claims. (Cl. 260—397.45)

This invention relates to novel cyclopentanopoly-hydrophenanthrene compounds having cortisone-like activity, and processes for the preparation of these products; more particularly, it is concerned with the new compounds $\Delta^4$ - 3,11,20-triketo-17α-hydroxypregnene-21-aldehyde and $\Delta^4$-3,20-diketo-11β,17α-dihydroxypregnene-21-aldehyde, derivatives thereof, and methods of preparing these compounds.

The adrenal cortical hormones, cortisone $\Delta^4$-3,11,20-triketo - 17α,21 - dihydroxypregnene and hydrocortisone ($\Delta^4$ - 3,20 - diketo-11β,17α,21-trihydroxypregnene) have been found to be very valuable in the treatment of various diseases. This invention is concerned with the preparation of novel compounds having cortisone-like activity but possessing different physical and chemical characteristics than cortisone and hydrocortisone.

It is an object of the present invention to provide new compounds of the formula:

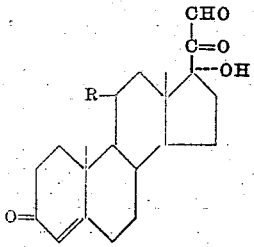

wherein R is a substituent from the group consisting of hydroxyl and keto. These compounds, $\Delta^4$-3,11,20-triketo - 17α - hydroxypregnene - 21-aldehyde, herein also called cortisone-21-aldehyde, and $\Delta^4$-3,20-diketo-11β,17α-dihydroxypregnene-21-aldehyde, herein also called hydrocortisone-21-aldehyde, are found to have cortisone-like activity and desirable physical and chemical characteristics. For example, cortisone-21-aldehyde is about three times as soluble in water as is cortisone.

It is a further object of this invention to provide novel aldehyde addition products of cortisone-21-aldehyde and hydrocortisone-21-aldehyde such as the hydrate, diacetate, dimethyl acetal, and diethyl acetal.

Another object is to provide processes for the preparation of cortisone-21-aldehyde, hydrocortisone-21-aldehyde, and derivatives thereof.

In accordance with our invention, it is now found that cortisone - 21 - aldehyde and hydrocortisone-21-aldehyde can be prepared by the following reactions:

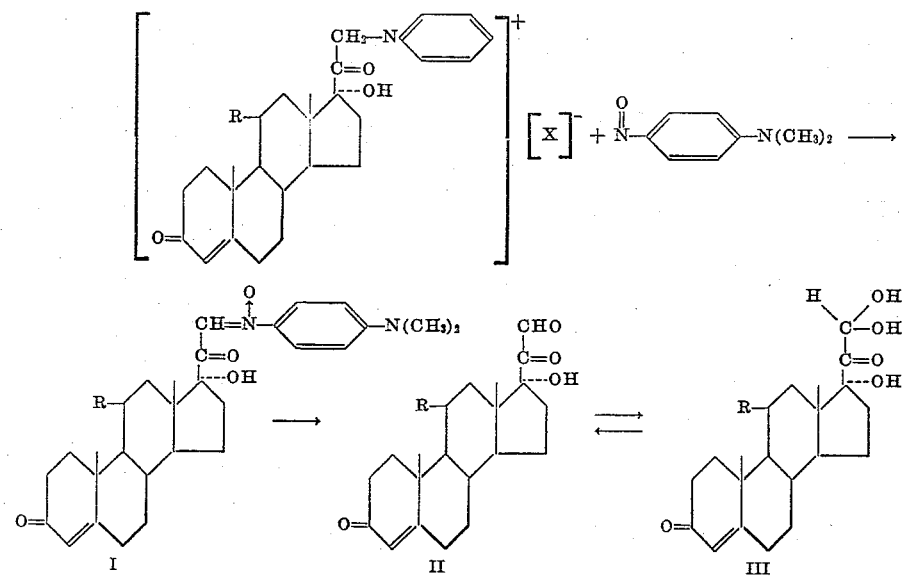

wherein R is a hydroxy or keto substituent and X is an acid anion.

In accordance with the foregoing flowsheet, a 21-pyridinium salt derived from cortisone or hydrocortisone is reacted with a nitroso compound such as p-nitrosodimethylaniline to form the corresponding 21-nitrone derivative (I) which on reaction with acid forms the aldehyde (II). The aldehyde is conveniently isolated in the form of the glyoxal derivative or hydrate (III) which is readily formed in aqueous solution.

In the first step of our process a 21-pyridinium salt derived from cortisone or hydrocortisone is intimately contacted with a nitroso compound such as p-nitrosodimethylaniline in the presence of a weak alkali such as an alkali metal bicarbonate to form the corresponding 21-nitrone derivative. This reaction is preferably effected employing a polar solvent such as an aqueous solution of a lower aliphatic alcohol, for example, aqueous methanol or aqueous ethanol, although solvents such as ethylene glycol or dioxane can also be used as solvent mediums. Usually, we prefer to employ the chloride or p-toluenesulfonate salts of the 21-pyridinium compounds, or a mixture of these salts as the starting materials in our process, since these salts are readily and conveniently prepared.

In carrying out the first step of our process in accordance with a preferred embodiment of our invention, the pyridinium salt is dissolved in aqueous methanol, the p-nitrosodimethylaniline and potassium bicarbonate are added and the reaction mixture is permitted to stand for about 24 hours. After the reaction is completed, the solid nitrone can be recovered by filtration and if desired may be further purified by recrystallization from suitable solvents.

The nitrone is readily converted to the corresponding aldehyde compound by suspending it in a suitable solvent such as a non-polar organic solvent and reacting it with acid. For example, the nitrone can be intimately contacted with aqueous hydrochloric acid in the presence of ether to form the desired aldehyde which is recovered as the free glyoxal or hydrate by concentrating the separated ether layer. Thus, when $\Delta^4$-3,11,20-triketo-17α-hydroxy-21-pregnenyl-N-(p-dimethylaminophenyl) nitrone is reacted with an aqueous solution of hydrochloric acid in the presence of ether, $\Delta^4$-3,11,20-triketo-17α-hydroxypregnene-21-aldehyde (cortisone aldehyde) is formed which under the reaction conditions forms the hydrate derivative, $\Delta^4$ - 17α,21,21 - trihydroxy-3,11,20-triketopregnene. Similarly, $\Delta^4$ - 3,20 - diketo - 11β,17α-dihydroxy-21-pregnenyl - N - (p-dimethylaminophenyl) nitrone forms $\Delta^4$-3,20 - diketo - 11β,17α - dihydroxypregnene-21-aldehyde (hydrocortisone aldehyde) which is isolated as the hydrate, $\Delta^4$ - 11β,17α,21,21 - tetrahydroxy-3,20-diketopregnene.

The novel aldehydes of the present invention and the hydrate or glyoxal derivatives thereof are readily converted to the corresponding aldehyde addition products. Thus, upon reaction $\Delta^4$-17α,21,21-trihydroxy-3,11,20-triketopregnene with acetic anhydride in the presence of pyridine the 21,21-diacetate derivatives is obtained. Similarly on treating cortisone aldehyde hydrate or hydrocortisone aldehyde hydrate with methanol or ethanol in the presence of an acid the corresponding 21,21-dimethoxy or 21,21-diethoxy derivatives are obtained.

The pyridinium derivatives of cortisone and hydrocortisone employed as starting materials in our process are conveniently prepared by reacting cortisone or hydrocortisone with pyridine in the presence of p-toluenesulfonyl chloride. This reaction results in the formation of a mixture of 21-pyridinium chloride salt and the 21-pyridinium p-toluene-sulfonate salts which may be recovered and separated, if desired, by fractional crystallization from suitable solvents. Alternatively, the mixture of the pyridinium salts can also be employed as the starting material in our process. The preparation of 21-pyridinium salts derived from cortisone and hydrocortisone is described and claimed in copending application Serial No. 285,329, filed April 30, 1952, now U. S. Patent 2,665,274, issued January 5, 1954.

Both cortisone-21-aldehyde and hydrocortisone-21-aldehyde are found to be fully as active as cortisone acetate in glycogen deposition assay.

Cortisone-21-aldehyde hydrate, tested by the granulation-inhibition test in rats, showed activity both locally and systematically. It appeared to be especially active systematically, since 1 mgm. daily subcutaneously produced 37.3% inhibition of the growth in granulation tissue.

When cortisone-21-aldehyde hydrate is administered to rats subcutaneously, 1 mgm. daily for 6 days, this compound had cortisone-like activity and produced some adrenal atrophy (23.6 mgm. mean adrenal weight compared to 34.2 mgm. for the controls), and involution of the thymus (267 mgm. compared to 397 mgm.).

The following examples are presented as specific embodiments of our invention.

EXAMPLE 1

*Preparation of $\Delta^4$-3,11,20-triketo-17α-hydroxy-21-pregnenyl-N-(p-dimethylaminophenyl) nitrone*

Cortisone (3.6 g.) was dissolved in 25 ml. of dry pyridine and p-toluenesulfonyl chloride (1.9 g.) was added. The resulting solution was allowed to stand at room temperature for one day. The reaction mixture was concentrated to dryness under reduced pressure at 40° C. and the residue dissolved in 100 ml. of warm methanol and 50 ml. of water. p-Nitrosodimethylaniline (1.3 g.) and a solution of 2.0 g. of potassium bicarbonate in 30 ml. of water were added. The resultant reaction mixture was allowed to stand for one day.

The solid nitrone was collected, washed with water, and air dried to give 2.2 g. of orange crystals, M. P. 182–3° C. (d.).

EXAMPLE 2

*Preparation of $\Delta^4$-3,11,20-triketo-17α-hydroxy-21-pregnenyl-N-(p-dimethylaminophenyl) nitrone*

1.0 g. of $\Delta^4$-17α-hydroxy-3,11,20-triketopregnenyl-21-pyridinium chloride, which may be prepared as described in U. S. Patent 2,665,274, was dissolved in 25 ml. of methanol and 12 ml. of water, 0.4 g. of p-nitrosodimethylaniline, and 0.2 g. of potassium bicarbonate in 12 ml. of water were then added. The reaction mixture was shaken and set aside to react for 24 hours. The solid nitrone was collected, washed with petroleum ether and air dried to give 0.8 g. of yellow crystals, M. P. 188–190° C.

Calc. for $C_{29}H_{36}N_2O_5$: C, 70.70; H, 7.37. Found: C, 71.98; H, 7.86.

EXAMPLE 3

*Preparation of $\Delta^4$3,11,20-triketo-17α-hydroxy-21-pregnenyl-N-(p-dimethylaminophenyl)-nitrone*

An aqueous methanol solution of 2.96 g. of $\Delta^4$-17α-hydroxy-3,11,20-triketopregnenyl-21-pyridinium p-toluenesulfonate was treated with a solution of 2.9 g. of p-nitrosodimethylaniline and 0.52 g. of potassium bicarbonate in 24 ml. of water. The reaction mixture was allowed to stand at room temperature for six days. The solid was collected, dissolved in methylene dichloride and absolute ethanol. The solution was concentrated in vacuo and the process repeated to remove any water from the system. The residue was dissolved in methylene dichloride and precipitated in crystalline form with methanol to give 1.6 g. of an orange solid M. P. 184–6° C. (d.).

Calc. for $C_{29}H_{36}N_2O_5$: C, 70.70; H, 7.37; N, 5.64. Found: C, 71.02; H, 7.43; N, 5.48.

EXAMPLE 4

*Preparation of $\Delta^4$-3,11,20-triketo-17α-hydroxypregnene-21-aldehyde and its isolation as the hydrate, $\Delta^4$-17α,21-21-trihydroxy-3,11,20-triketopregnene*

0.5 g. of $\Delta^4$-3,11,20-triketo-17α-hydroxy-21-pregnenyl-N-(p-dimethylaminophenyl)-nitrone was shaken with 50 ml. of 1 N hydrochloric acid and 250 ml. of ether for two hours. The ether layer was collected and washed successively with dilute hydrochloric acid, water, sodium bicarbonate solution and water. After drying over sodium sulfate the organic layer was concentrated to yield 45 mg. of $\Delta^4$-17α,21,21-trihydroxy-3,11,20-triketopregnene. The mother liquors on re-extraction with ether yielded an additional 40 mg. of product.

The $\Delta^4$-17α,21,21-trihydroxy-3,11,20-triketopregnene on recrystallization from aqueous acetone was found to have the following properties:

*Melting point.*—Losses water >100° C., sinters and darkens at 180–185° C.

*Rotation.*—$[\alpha]_D^{24}+182°$ 2% in methanol.

*U. V. absorption.*—λ maximum at 2380, E% 411, E mol. 15,500.

*Solubilities.*—66 mg./100 ml. water, >10% in methanol, 2% in chloroform on prolonged shaking.

*Analysis.*—Calc. for $C_{21}H_{28}O_6$: Mol. Wt. 376.4. C, 67.00; H, 7.50. Found: C, 67.01; H, 7.75.

On dehydration the hydrate can be converted to the free aldehyde form.

EXAMPLE 5

$\Delta^4$ - 3,20 - diketo - 11$\beta$,17$\alpha$ - dihydroxy - 21 - pregnenyl - N-(dimethylaminophenyl)-nitrone $\Delta^4$ - 11$\beta$,17$\alpha$ - dihydroxy - 3,20 - diketopregnenyl - 21 - pyridinium chloride (830 mg.), which may be prepared as described in U. S. Patent 2,665,274, was dissolved in 5 ml. of methanol and 6 ml. of water and treated with 320 mg. p-nitrosodimethylaniline. When all the solid had dissolved, 0.17 g. of potassium bicarbonate in 1 ml. of water was added. The reaction mixture was allowed to stand at room temperature for 72 hours. The precipitated nitrone was collected and washed with a small amount of cold water and air dried to give 570 mg. orange-dark red solid, M. P. 186-8° C.

Calc. for $C_{29}H_{36}O_5N_2$: C, 70.70; H, 7.37; N, 5.69. Found: C, 69.77; H, 7.73; N, 6.03.

EXAMPLE 6

*Preparation of $\Delta^4$-3,20 - diketo - 11$\beta$,17$\alpha$ - dihydroxypregnene-21-aldehyde and its isolation as the hydrate $\Delta^4$-11$\beta$,17$\alpha$,21,21-tetrahydroxy-3,20-diketopregnene*

$\Delta^4$ - 3,20 - diketo - 11$\beta$,17$\alpha$ - dihydroxy - 21 - pregnenyl-N-(dimethylaminophenyl)-nitrone (1.2 g.) was suspended in 50 ml. of 1 N hydrochloric acid and covered with 100 ml. ether. The mixture was shaken until all the solid had dissolved. The layers were separated and the aqueous layer shaken with three 100 ml. portions of ether. The ether layers were combined, washed with 2.5 N hydrochloric acid, water, dilute sodium bicarbonate solution and water and was then dried over magnesium sulfate and concentrated to dryness. The residue was dissolved in acetone; water added to the cloud point and the solution charcoaled. The solution was concentrated in vacuo to a small volume and the crystals collected and air dried to give 520 mg. of product, M. P. 150-170° C. U. V. data: max.=2420, E%=423, diene=0.50%, Em=15,250.

EXAMPLE 7

*$\Delta^4$ - 21,21-dimethoxy-17$\alpha$-hydroxy-3,11,20-triketopregnene*

200 mg. of $\Delta^4$-17$\alpha$,21,21 - trihydroxy - 3,11,20 - triketopregnene was dissolved in 15 cc. of anhydrous methanolic-hydrogen chloride and allowed to stand for one hour at room temperature. 500 cc. of ether was added and then an excess of saturated sodium bicarbonate solution. The ether layer was separated, washed with sodium carbonate solution, water, dried over sodium sulfate and vacuum evaporated to a syrup which solidified on scratching. Yield 100 mg. M. P. 135-140° C. This was recrystallized by dissolving in 400 cc. ether, treating with activated charcoal, filtering, and evaporating to 5 cc. Recovered 70 mg. of the dimethyl acetal as fine needles M. P. 142° C., and rotation $[\alpha]_D^{20}+176°$ (2% in methanol).

*Anal.*—Calc. for $C_{23}H_{32}O_6$: C, 68.29; H, 7.98. Found: C, 68.36; H, 8.01.

When crude cortisone aldehyde hydrate is employed as starting material, the dimethyl acetal is contaminated with a tan colored impurity which can be removed by filtering the ethereal solution of the acetal through a layer of alumina.

EXAMPLE 8

*$\Delta^4$ - 21,21-diethoxy-17$\alpha$-hydroxy-3,11,20-triketopregnene*

The diethyl acetal was prepared from 200 mg. of 17$\alpha$,21,21 - trihydroxy - 3,11,20 - triketopregnene in a manner analogous to the dimethyl acetal.

*Anal.*—Calc. for $C_{25}H_{38}O_6$: C, 69.42; H, 8.39. Found: C, 69.48; H, 8.52.

M. P. 77° C. (micro-block). Rotation $[\alpha]_D^{25}+165°$ (2% in methanol).

EXAMPLE 9

*$\Delta^4$ - 21,21-diacetoxy-17$\alpha$-hydroxy-3,11,20-triketopregnene*

2 g. of $\Delta^4$-17$\alpha$,21,21-trihydroxy-3,11,20-triketopregnene was dissolved in 15 ml. of acetic anhydride and 1 ml. of pyridine and allowed to stand for 2 days. To the resulting reaction mixture was added 20 ml. of 50% acetic acid. The solution was then evaporated under diminished pressure to a syrup. The syrup was triturated with 40 ml. of water until the gum solidified. On filtering the triturated mixture, 2.15 g. of crude diacetate having a melting point of 130-150° C., was obtained. The crude product was dissolved in 30 ml. of amyl acetate, treated with activated charcoal and filtered. Concentration of the filtrate to about 7 ml. and cooling afforded 0.95 g. of the diacetate derivative as a white precipitate, melting at 168° C. Rotation $[\alpha]_D^{24}+99°$ (2% in methanol).

EXAMPLE 10

*$\Delta^4$-3,11,20-triketo-17$\alpha$-hydroxypregnene-21-aldehyde*

A sample of $\Delta^4$-17$\alpha$,21,21-trihydroxy-3,11,20-triketopregnene was dehydrated by heating at 110° C. over phosphorus pentoxide under diminished pressure for eighteen hours. The resulting yellow product, $\Delta^4$-3,11,20-triketo-17$\alpha$-hydroxypregnene-21-aldehyde, had a melting point of 210-215° C. (dec.). The aldehyde has an absorption band at 4500 Å. (Em 36) which is characteristic of decarbonyl compounds, such as methylglyoxal and glyoxal.

*Anal.*—Calc. for $C_{21}H_{26}O_5$: C, 70.36; H, 7.31. Found: C, 70.09; H, 7.52.

Various changes and modifications may be made in carrying out the present invention without departing from the spirit and scope thereof. Insofar as these changes and modifications are within the scope of the appended claims, they are to be considered as part of this invention.

We claim:

1. $\Delta^4$ - 3,11,20 - triketo - 17$\alpha$ - hydroxypregnene - 21 - aldehyde.

2. $\Delta^4$ - 3,20 - diketo - 11$\beta$,17$\alpha$ - dihydroxypregnene - 21-aldehyde.

3. $\Delta^4$ - 17$\alpha$,21,21 - trihydroxy - 3,11,20 - triketopregnene.

4. $\Delta^4$ - 11$\beta$,17$\alpha$,21,21 - tetrahydroxy - 3,20 - diketopregnene.

5. $\Delta^4$ - 21,21 - dimethoxy - 17$\alpha$ - hydroxy - 3,11,20 - triketopregnene.

6. $\Delta^4$ - 21,21 - diethoxy - 17$\alpha$ - hydroxy - 3,11,20 - triketopregnene.

7. $\Delta^4$ - 21,21 - diacetoxy - 17$\alpha$ - hydroxy - 3,11,20 - triketopregnene.

8. A compound from the group consisting of $\Delta^4$-3,11,20-triketo - 17$\alpha$ - hydroxypregnene - 21 - aldehyde, $\Delta^4$-3,20-diketo - 11$\beta$,17$\alpha$ - dihydroxypregnene - 21 - aldehyde, and the 21,21-dihydroxy, the 21,21-di-lower alkoxy and the 21,21-diacyloxy derivatives thereof wherein the acyl group is a lower fatty acid radical.

9. The process which comprises reacting $\Delta^4$-17$\alpha$-hydroxy - 3,11,20 - triketopregnenyl - 21 - pyridinium chloride with p-nitrosodimethylaniline, and reacting the resulting reaction product with hydrochloric acid to form $\Delta^4$-17$\alpha$-hydroxy-3,11,20-triketopregnene-21-aldehyde.

10. The process which comprises reacting $\Delta^4$-17$\alpha$-hydroxy - 3,11,20 - triketopregnenyl - 21 - pyridinium p-toluene- sulfonate with p-nitrosodimethylaniline, and reacting the resulting reaction product with hydrochloric acid to form $\Delta^4$-17$\alpha$-hydroxy-3,11,20-triketopregnene-21-aldehyde.

11. The process which comprises reacting a $\Delta^4$-17$\alpha$-hydroxy-3,11,20-triketopregnenyl-21-pyridinium salt with a nitroso compound, and reacting the resulting reaction product with an acid to form $\Delta^4$-17$\alpha$-hydroxy-3,11,20-triketopregnene-21-aldehyde.

12. The process which comprises reacting $\Delta^4$-11$\beta$,17$\alpha$-dihydroxy-3,20-diketopregnene-21-pyridinium chloride with p-nitrosodimethylaniline, and reacting the resulting reaction product with hydrochloric acid to form $\Delta^4$-11$\beta$,17$\alpha$-dihydroxy-3,20-diketopregnene-21-aldehyde.

13. The process which comprises reacting a $\Delta^4$-11$\beta$,17$\alpha$-dihydroxy-3,20-diketopregnenyl-21-pyridinium salt with a nitroso compound, and reacting the resulting reaction product with an acid to form $\Delta^4$-11$\beta$,17$\alpha$-dihydroxy-3,20-diketopregnene-21-aldehyde.

14. The process which comprises reacting a compound from the group consisting of $\Delta^4$-3,11,20-triketo-17$\alpha$-hydroxy-pregnenyl-21-pyridinium salts and $\Delta^4$-3,20-diketo-11$\beta$,17$\alpha$-dihydroxy-pregnenyl-21-pyridinium salts with a nitroso compound, and reacting the resulting reaction product with acid to form the corresponding 21-aldehyde.

15. The process which comprises reacting a compound from the group consisting of $\Delta^4$-3,11,20-triketo-17$\alpha$-hydroxy-pregnenyl-21-pyridinium salts and $\Delta^4$-3,20-diketo-11$\beta$-17$\alpha$-dihydroxy-pregnenyl-21-pyridinium salts with a nitroso compound, reacting the resulting reaction product with an acid to form the corresponding 21-aldehyde, and recovering said aldehyde as the 21,21-dihydroxy derivative.

16. $\Delta^4$-3,11,20-triketo-17$\alpha$-hydroxypregnenyl-21-N(p-dimethylaminophenyl)-nitrone.

17. $\Delta^4$-3,20-diketo-11$\beta$,17$\alpha$-dihydroxypregnenyl-21-N-(p-dimethylaminophenyl)-nitrone.

18. The process which comprises reacting a $\Delta^4$-3,11,20-triketo-17$\alpha$-hydroxypregnenyl-21-pyridinium salt with p-nitroso-dimethylaniline to form $\Delta^4$-3,11,20-triketo-17$\alpha$-hydroxypregnenyl-21-N-(p-dimethylaminophenyl)-nitrone.

19. The process which comprises reacting a $\Delta^4$-3,20-diketo-11$\beta$,17$\alpha$-dihydroxypregnenyl-21-pyridinium salt with p-nitrosodimethylaniline to form $\Delta^4$-3,20-diketo-11$\beta$,17$\alpha$-dihydroxypregnenyl-21-N-(p-dimethylaminophenyl)-nitrone.

References Cited in the file of this patent
UNITED STATES PATENTS

| | | |
|---|---|---|
| 2,563,247 | Kendall | Aug. 7, 1951 |
| 2,577,018 | Kendall | Dec. 4, 1951 |